(12) United States Patent
Sonnek et al.

(10) Patent No.: US 9,415,342 B2
(45) Date of Patent: Aug. 16, 2016

(54) MOLECULAR SIEVE DEPRESSURIZATION RECOVERY SYSTEM

(71) Applicant: IntegroEnergy Group Inc., Utica, SD (US)

(72) Inventors: Daniel W. Sonnek, Lake Crystal, MN (US); Gregory W. Loest, Utica, SD (US)

(73) Assignee: INTEGROENERGY GROUP, INC., Utica, SD (US)

( * ) Notice: Subject to any disclaimer, the term of this patent is extended or adjusted under 35 U.S.C. 154(b) by 0 days.

(21) Appl. No.: 14/714,943

(22) Filed: May 18, 2015

(65) Prior Publication Data

US 2015/0251128 A1 Sep. 10, 2015

Related U.S. Application Data

(63) Continuation of application No. 13/432,124, filed on Mar. 28, 2012, now Pat. No. 9,068,700.

(60) Provisional application No. 61/468,800, filed on Mar. 29, 2011.

(51) Int. Cl.
  *B01D 53/04* (2006.01)
  *F17D 1/16* (2006.01)
  *B01D 3/14* (2006.01)
  *B01D 19/00* (2006.01)
  *B01D 53/26* (2006.01)

(52) U.S. Cl.
  CPC .............. *B01D 53/0438* (2013.01); *B01D 3/14* (2013.01); *B01D 19/0036* (2013.01); *B01D 53/0446* (2013.01); *B01D 53/261* (2013.01); *F17D 1/16* (2013.01); *B01D 2253/116* (2013.01); *B01D 2257/80* (2013.01); *Y02C 10/08* (2013.01); *Y02P 70/34* (2015.11); *Y10T 137/0396* (2015.04)

(58) Field of Classification Search
  None
  See application file for complete search history.

(56) References Cited

U.S. PATENT DOCUMENTS

| | | | |
|---|---|---|---|
| 8,476,180 B2* | 7/2013 | Hilaly | B01D 15/00 502/30 |
| 2007/0088182 A1 | 4/2007 | Hilaly et al. | |
| 2012/0078003 A1* | 3/2012 | Brown | C07C 29/76 560/129 |
| 2013/0225880 A1* | 8/2013 | Brown | B01D 53/047 568/916 |

* cited by examiner

*Primary Examiner* — Chester Barry
(74) *Attorney, Agent, or Firm* — Barbara A. Wrigley; Fox Rothschild LLP

(57) ABSTRACT

A system for depressurizing a molecular sieve used in ethanol production is provided. The ethanol production system includes a plurality of on-line molecular sieve bottles for removing water from ethanol production. When the molecular sieve bottle becomes saturated with water it is taken off-line to depressurize it. The depressurization and removal of water is done from the product discharge end resulting in an approximately 5% to 10% reduction in external energy required to run the ethanol production line.

2 Claims, 2 Drawing Sheets

MOLECULAR SIEVE DEPRESSURIZATION RECOVERY SYSTEM

CROSS REFERENCE TO RELATED APPLICATIONS

This application is a continuation of U.S. patent application Ser. No. 13/432,124, filed on Mar. 28, 2012, now U.S. Pat. No. 9,068,700 issued on Jun. 30, 2015; which claims the benefit of U.S. provisional patent application Ser. No. 61/468,800, filed on Mar. 29, 2011; the entireties of which are incorporated by reference herein.

FIELD OF THE INVENTION

The present invention is generally directed to ethanol processing. More particularly, the present invention is directed to an improved system and method for depressurizing molecular sieve bottles at the product discharge end during ethanol production.

BACKGROUND OF THE INVENTION

The United States is the world's largest producer of corn. U.S. production reached 9.5 billion bushels in 2001, greatly exceeding the production of any other grain (National Corn Growers Association 2002). Direct use as animal feed is the largest consuming application, accounting for 5.85 billion bushels in 2001. Corn processing, either via wet milling into sweeteners, starch, ethanol and other industrial products, or via dry milling for ethanol production, accounted for 1.7 billion bushels of US consumption in 2001, or slightly less than 18% of the crop.

Corn processing is expected to increase significantly over the next decade. Ethanol production has been the largest single application of corn processing since 1999, reflecting the recent high growth of the fuel ethanol market as an alternative fuel to gasoline alone. Legislative and lobbying efforts are promoting a renewable fuels standard for gasoline. Most projections are for a three-fold increase in ethanol production, accounting for another 1.4 billion bushels of corn consumption if no significant changes are made to existing manufacturing processes. Ethanol not only burns cleaner than fossil fuels but also can be produced using grains such as corn, which is a renewable resource. Further, the production of ethanol results in new sales outlets for corn, provides additional jobs, and reduces the nation's dependency on foreign oil.

Ethanol is typically produced from corn through either a wet or dry milling process. In the wet milling process, the corn kernel is separated into its components including germ, fiber, protein and starch. These may be further processed into several co-products. For example, separated germ may be further processed for oil recovery; starch may be saccharified and fermented for ethanol production; and protein and fiber may be used as feed material.

In a dry mill process, whole corn is ground into flour, treated with enzymes, and cooked. The resulting "mash" is treated with enzymes to further break down the starchy endosperm tissue into glucose. The converted mash is fermented and distilled, producing ethanol, carbon dioxide, and distiller's grains with solubles ("DDG"). If sold as wet animal feed, the co-product is known as distiller's wet grains with solubles ("DWGS"). Conversely, if dried for animal feed, the co-product is known as distiller's dried grains with solubles ("DDGS"). In the standard dry grind ethanol process, one bushel of corn yields approximately 8.2 kilograms (i.e. approximately 18 pounds) of DDGS in addition to the approximately 10.2 liters (i.e. approximately 2.7 gallons) of ethanol. These co-products provide a critical secondary revenue stream that offsets a portion of the overall cost of ethanol production.

Within typical ethanol production facilities, a small percentage of water, typically 5% by volume, is present in the ethanol resulting in 190-proof ethanol. Current technology for ethanol production employs molecular sieves to remove the last approximately 5% of water from the product. A molecular sieve is typically a bottle containing ceramic beads or other medias with an affinity for water, as known by those of skill in the art. When the 190 proof ethanol passes through a molecular sieve, the molecular sieve pulls the last approximately 5% of water resulting in anhydrous ethanol, i.e. 200-proof, that can be blended with gasoline.

Processes running vacuum distillation systems will typically condense the resulting 190-proof ethanol vapor and then pump it into a vaporizer which in turn is then fed into one or more molecular sieves at a much higher pressure to produce 200-proof ethanol. However, after a sieve bottle is in production for a period of time, the media becomes saturated and may start passing ethanol containing more moisture than is desired. At this point, the molecular sieve will be taken off line and depressurized. Typically the molecular sieve bottle is depressurized back to the rectifier condenser from the feed side of the bottle. This is referred to as reverse flow. The reverse flow stream is then pumped back to the sieve vaporizer as a recycle stream which will use additional energy for the vaporization and pumping of this ethanol.

Reverse flow systems for regenerating molecular sieves reduce plant capacity and requires excess plant energy to run. Because there is a large number of existing ethanol plants based on corn dry milling, and the number is increasing rapidly, it would be desirable to have a process that could be integrated into these plants to improve plant efficiency by freeing up plant capacity while at the same time reducing energy consumption.

BRIEF SUMMARY OF THE INVENTION

The present invention addresses the problems associated with conventional molecular sieve depressurization systems. In one aspect, the present invention encompasses a system and method that depressurizes the molecular sieve bottles from the product discharge end. More particularly, the system is structured and operable to take the driest ethanol out first without using reverse flow as is typically done in other systems. The product is then routed to a condensing system that discharges to a 200 proof flash vessel where it joins the other 200 proof for $CO_2$ removal during the first part of depressurization.

In a further aspect of the present invention, after the liquid passes through the 200 proof condenser, it then passes out of the process via a heat exchanger that pulls the heat from the 200 proof and puts it in the 190 proof feed going to the vaporizer. The product is then pumped to the product tank so there is limited recycle. By moving this product forward, there is a decrease in molecular sieve feed by at least approximately 5-10% with the same product flow. This translates to more than approximately 5-10% reduction in the vaporizer energy input due to the reduced feed rate as well as increased feed temperature. The additional heat in the feed is due to the higher product to feed ratio that drives the 190 feed economizer.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF THE INVENTION

In a typical dry mill plant utilizing the dry mill process, the corn is delivered to the ethanol plant and loaded into storage bins. The grain is typically screen to remove debris and ground into course corn flour. The milled grain is mixed with water, pH adjusted and enzymes are added. The resulting slurry is heated to about 180-190 degrees F. to reduce viscosity. The slurry is then pumped through a pressurized cooker and subjected to approximately 221° F. for 3-8 minutes. The mixture is then cooled by a vacuum flash condenser. After flash condensation cooling the mixture is held for a number of hours at about 180-190° F. to give the enzyme sufficient time to break down the starch into short chain dextrins. Additional enzymes are added to break down the dextrins into simple sugars and the mixture is pumped into a fermentation tank where it is now referred to as mash. Yeast is added to convert the sugar to ethanol, carbon dioxide and solids. The carbon dioxide is typically captured and purified with a scrubber so it can be marketed to the food processing industry for use in carbonated beverages and flash-freezing applications.

The present inventors have advantageously improved the aforementioned typical dry mill process as described in U.S. application Ser. No. 12/350,600, which is hereby incorporated by reference in its entirety.

Figure 1:
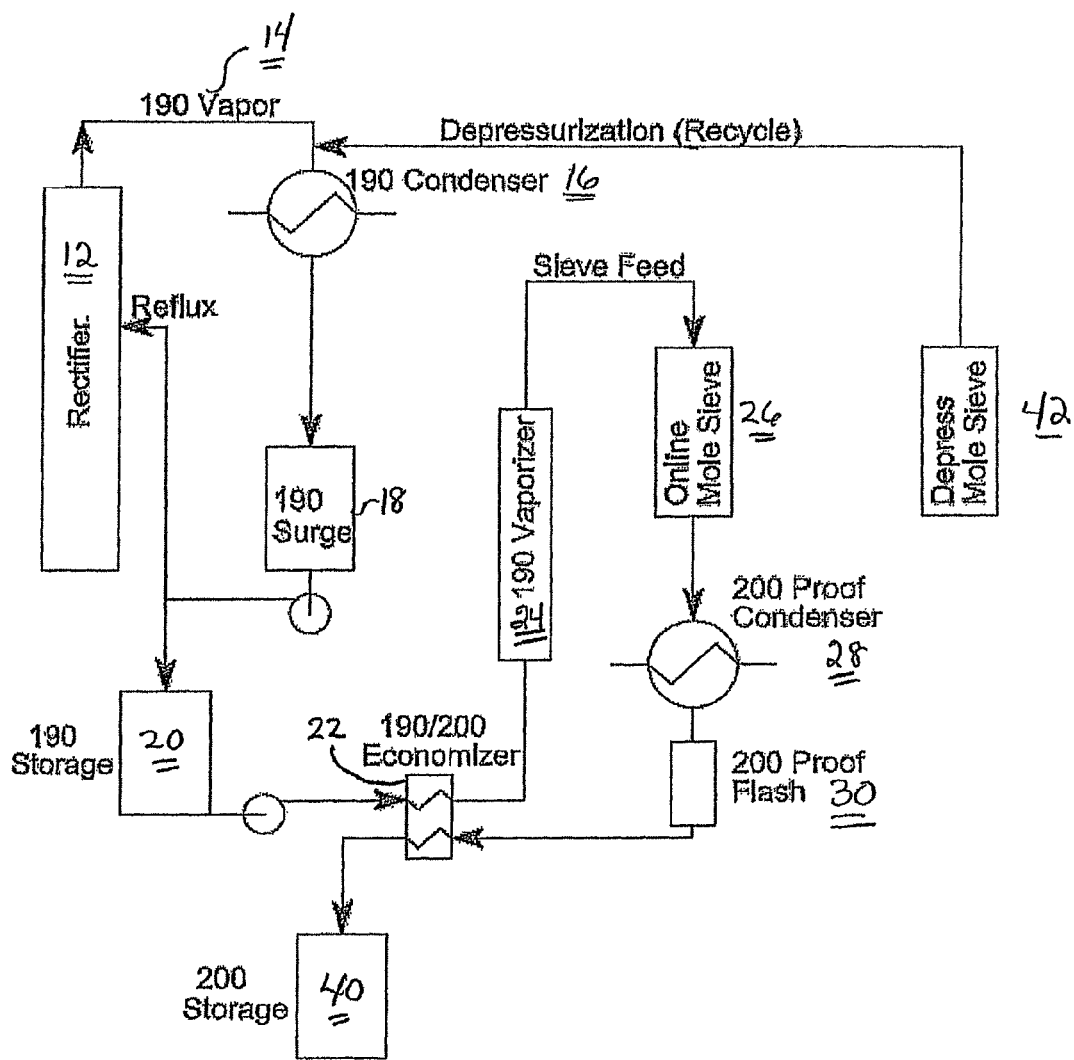
FIG. 1 is a circuit diagram illustrating a typical molecular sieve depressurization process.

Referring now to FIG. 1 the fermented mash is pumped into a multi-column distillation system or rectifier 12 where additional heat is added. The columns utilize the differences in the boiling points of ethanol and water to boil off and separate the ethanol. When the vaporous product stream leaves the distillation columns, it contains about 95% ethanol by volume (190-proof) and the remainder is 5% water by volume. The residue from the process, called stillage, contains non-fermentable solids and water and is pumped out from the bottom of the columns where it is further processed into DDG which is commonly used as a high-protein ingredient in cattle, swine, poultry, and fish food.

The 190-proof vapor 14 is then pumped into a condenser 16 where it is condensed to a liquid product stream. The 190-proof liquid product stream is then passed into a surge, a small tank that is designed to accommodate pressure changes in the system. The liquid product stream is collected in the surge tank and split between reflux (or recycle) and storage tank 20. The storage tank 20 allows for process surges because the 190-proof product stream is going from a vapor to a liquid and back to a vapor again. As the 190-proof liquid product stream passes through the economizer 22 it heats up the liquid which is then pumped into vaporizer 24 which vaporizes or turns the warmed up liquid back into a vapor product stream. The 190-proof vapor product stream is passed through a molecular sieve which physically separates the remaining water from the ethanol based on the different sizes of the respective molecules. This step produces 200-proof anhydrous ethanol vapor. The 200-proof anhydrous ethanol vapor is then passed through condenser 28 where it is turned again into a liquid. The 200-proof ethanol liquid product stream is then pumped through a flash tank 30 which allows the carbon dioxide to flash out of the liquid so it does not form carbonic acid in the fuel when later combined with gasoline. The 200-proof liquid ethanol product stream is then pumped into an economizer 22 or heat recovery system that cools the 200-proof liquid by extracting heat from the liquid. The heat is routed to the 190-proof liquid product stream being pumped to vaporizer 24. A small amount of denaturant is added to the 200-proof liquid ethanol before it is sent to the storage tank 40 making it unfit for human consumption. Storage tank 40 can typically hold seven to ten days production capacity.

Eventually, the molecular sieve will pull enough water from the ethanol product stream that the media becomes saturated. In this case, the molecular sieve needs to be taken off-line 42 and depressurized. In the depressurization or recycle process the molecular sieve containing water is depressurized back to condenser 16 from the feed side of the bottle. This is referred to as reverse flow. The reverse flow stream is then pumped back through the system to vaporizer 24 as a recycle stream which will use additional energy for the vaporization and pumping of this ethanol.

Figure 2:
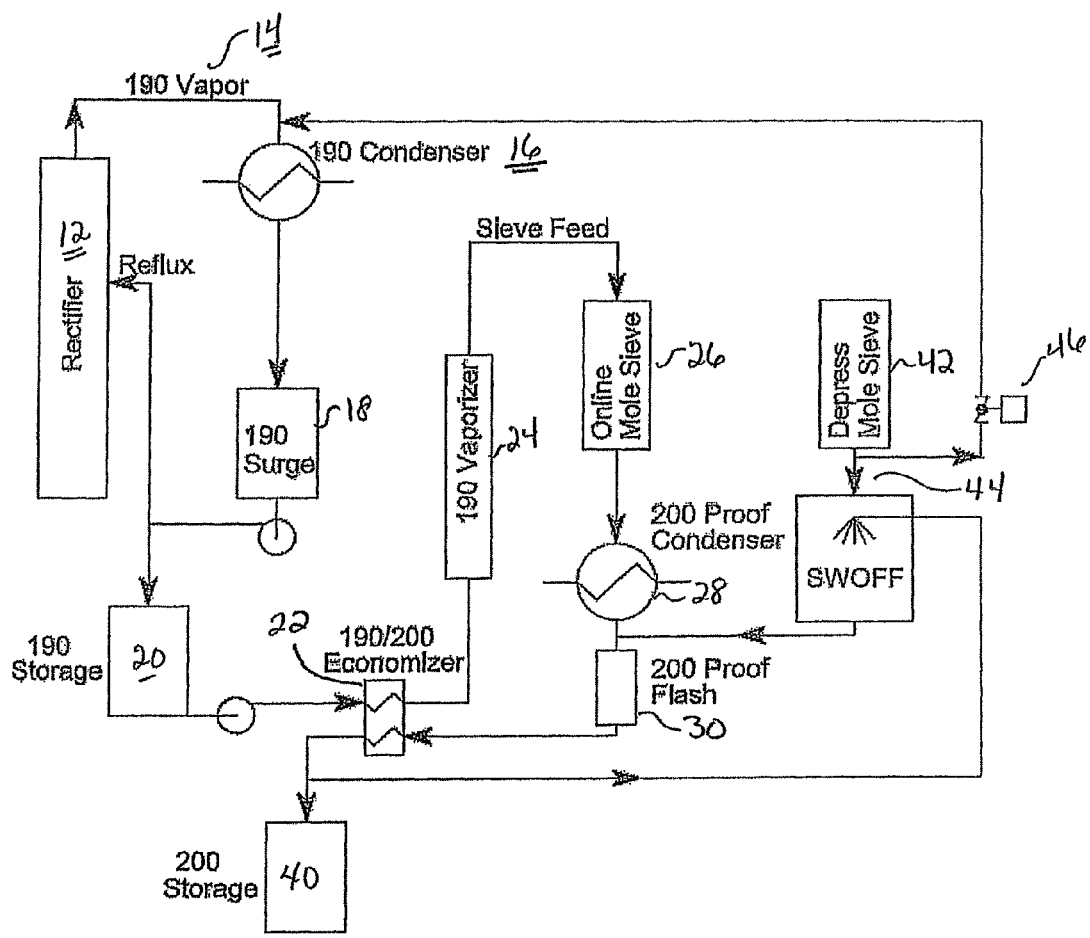
FIG. 2 is a circuit diagram illustrating the molecular sieve depressurization system and process in accordance with the present invention.

The foregoing process has been vastly improved by the depressurization system and method in accordance with the invention. Referring now to FIG. 2, like items are indicated with like numerals. Fermented mash is pumped into a multi-column distillation system or rectifier 12 where additional heat is added. The columns utilize the differences in the boiling points of ethanol and water to boil off and separate the ethanol. When the vaporous product stream leaves the distillation columns, it contains about 95% ethanol by volume (190-proof) and the remainder is 5% water by volume. The residue from the process, called stillage, contains non-fermentable solids and water and is pumped out from the bottom of the columns where it is further processed into DDG which is commonly used as a high-protein ingredient in cattle, swine, poultry, and fish food.

The 190-proof vapor 14 is then pumped into condenser 16 where it is condensed to a liquid product stream. The 190-proof liquid product stream is then passed into a surge where it is split between reflux (or recycle) and storage tank 20. The storage tank 20 allows for process surges because the 190-proof product stream is going from a vapor to a liquid and back to a vapor again. As the 190-proof liquid product stream passes through the economizer/heat exchanger 22 it heats up the liquid which is then transferred to vaporizer 24, which vaporizes or turns the warmed up liquid back into a vapor product stream. The 190-proof vapor product stream is then passed through an on-line molecular sieve, or plurality of molecular sieves, which physically separates the remaining water from the ethanol based on the different sizes of the respective molecules. This step produces anhydrous, or 200-proof, ethanol vapor. The 200-proof anhydrous ethanol vapor is then passed through condenser 28 where it is turned again into a liquid. The 200-proof ethanol liquid product stream is then pumped through a flash tank 30 which allows the carbon dioxide to flash out of the liquid so it does not form carbonic acid in the fuel when late combined with gasoline. The 200-proof liquid ethanol product stream is then pumped into economizer 22, a heat recovery system that cools the 200-proof liquid by extracting heat from the liquid. A small amount of denaturant is added to the 200-proof liquid ethanol before it is sent to the storage tank 40 making it unfit for human consumption. Storage tank 40 can typically hold seven to ten days production capacity.

When a particular molecular sieve becomes saturated it is taken off-line 42 to be depressurized. However, in the novel method in accordance with the invention, depressurization occurs from the product discharge end 44. The first step of the depressurization in accordance with the invention removes the driest ethanol out of the molecular sieve bottle (approximately 70-75% of the bottle contents) without reversing the flow through the molecular sieve media. This product is then routed to a "sweeten off" condenser that condenses the vapor and discharges the resulting liquid to a 200 proof flash vessel 30 where it mixes with the 200-proof liquid from condenser 28 for carbon dioxide removal in the 200 proof flash vessel 30. In the second step of depressurization in accordance with the invention, an automatic valve 46 opens to condenser 16 if lower pressures are required. The combined 200-proof liquid ethanol product stream is then pumped into an economizer/heat exchanger 22 that cools the 200-proof liquid by extracting heat from the liquid. The heat is transferred to the 190-proof liquid product stream being pumped to vaporizer 24. A small amount of denaturant is added to the 200-proof liquid ethanol before it is pumped into the storage tank 40 making it unfit for human consumption. Storage tank 40 can typically hold seven to ten days production capacity.

The system and method in accordance with the invention limits recycle time and energy. By extracting the 200-proof final product from the molecular sieve product discharge line instead of reversing flow through the molecular sieve media, there is a decrease of approximately 5-10% in the 190-proof product stream coming off the 190-vaporizer with the same product flow as the 200-proof product production rate. This translates to a 5% to 10% reduction in energy input to vaporizer 24 due to the reduced feed rate. With less 190 product feed and the same 200-proof product flow, the 190-proof product feed will be hotter by approximately 2-5° F. The additional heat in the feed stream is due to the higher product to feed ratio that drives economizer 22.

While select embodiments of the present invention have been described, it should be understood that various changes, adaptations and modifications may be made without departing from the spirit of the invention and the scope of the appended claims.

What is claimed:

1. A system for depressurizing a molecular sieve used in ethanol production comprising:
    a rectifier for producing 190-proof ethanol vapor;
    a condenser for condensing the 190-proof ethanol to a liquid product stream;
    an economizer for heating the 190-proof ethanol;
    a vaporizer for vaporizing the 190-proof ethanol into a vapor product stream;
    at least one on-line molecular sieve columns for removing water from said 190-proof ethanol vapor stream to produce 200-proof anhydrous ethanol, said at least one molecular sieve column having a product input end and a product discharge end and including a media therewithin, wherein said off-line molecular sieve columns are configured to contain said 200-proof anhydrous ethanol at the product discharge end, wherein said at least one on-line molecular sieve column is configured to be depressurized from the product discharge end without reversing flow through the molecular sieve media to the input end;
    an extraction mechanism for extracting at least a portion of said 200-proof anhydrous ethanol from said product discharge end;
    a condenser for turning at least a portion of said anhydrous ethanol to 200-proof liquid ethanol;
    a flash vessel for removing carbon dioxide from the 200-proof liquid ethanol; and
    a storage tank for storing said 200-proof liquid ethanol.

2. The system of claim 1 further comprising an automatic valve that opens to a 190-proof condenser in the system to lower pressure in said off-line molecular sieve column.

* * * * *